United States Patent [19]

Ohmae et al.

[11] Patent Number: 5,047,479

[45] Date of Patent: Sep. 10, 1991

[54] THERMOPLASTIC RESIN COMPOSITION

[75] Inventors: Tadayuki Ohmae; Yoshiki Toyoshima; Kentaro Mashita; Jinsho Nambu, all of Chiba, Japan

[73] Assignee: Sumitomo Chemical Co., Ltd., Osaka, Japan

[21] Appl. No.: 396,786

[22] Filed: Aug. 21, 1989

Related U.S. Application Data

[63] Continuation of Ser. No. 155,781, Feb. 16, 1988, abandoned.

[30] Foreign Application Priority Data

Feb. 16, 1987 [JP] Japan .................................. 62-32781

[51] Int. Cl.$^5$ .............................................. C08L 77/00
[52] U.S. Cl. ...................................... 525/183; 525/179; 525/181; 525/182
[58] Field of Search ............................... 525/183, 179

[56] References Cited

U.S. PATENT DOCUMENTS

| | | | |
|---|---|---|---|
| 4,086,295 | 4/1978 | Mori et al. | 525/183 |
| 4,602,058 | 7/1986 | Graham et al. | 524/320 |
| 4,791,164 | 12/1988 | Wichelhaus et al. | 524/514 |

FOREIGN PATENT DOCUMENTS

| | | |
|---|---|---|
| 0234819 | 9/1987 | European Pat. Off. . |
| 0258040 | 3/1988 | European Pat. Off. . |
| 52-80351 | 7/1977 | Japan . |
| 60-181160 | 9/1985 | Japan . |
| 60-181161 | 9/1985 | Japan . |
| WO86/6803-97 | 11/1986 | PCT Int'l Appl. .................. 525/183 |

*Primary Examiner*—Ana L. Carrillo
*Attorney, Agent, or Firm*—Sughrue, Mion, Zinn, Macpeak & Seas

[57] ABSTRACT

A thermoplastic resin composition is disclosed, which is obtained by melt-kneading (A) from 60 to 97 parts by weight of a polyamide resin and (B) from 3 to 40 parts by weight of an ethylene copolymer comprising (a) from 40 to 90% by weight of an ethylene unit, (b) from 5 to 60% by weight of an alkyl $\alpha$, $\beta$-unsaturated carboxylate unit, and (c) from 0.3 to 10% by weight of a maleic anhydride unit and then melt-kneading the resulting composition with (C) from 0.01 to 20 parts by weight of a polyfunctional compound having at least two functional groups having reactivity to a carboxyl group, a carboxylic acid anhydride group or an amino group per molecule to effect partial crosslinking reaction. The composition provides molded articles having a good balance of physical properties and satisfactory appearance.

3 Claims, No Drawings

THERMOPLASTIC RESIN COMPOSITION

This is a continuation of application Ser. No. 07/155,781 filed Feb. 16, 1988, now abandoned.

This invention relates to a crosslinked thermoplastic resin composition which can be molded by injection, extrusion or the like molding method into sheets, films, etc. More particularly, it relates to a crosslinked thermoplastic resin composition comprising a polyamide resin, an ethylene copolymer containing an acid anhydride group, and a crosslinkable polyfunctional compound, which exhibits various physical properties in good balance, satisfactory appearance, and high softness.

BACKGROUND OF THE INVENTION

Polyamide resins are widely employed as engineering plastics because of their excellent properties in, for example, rigidity, abrasion resistance, chemical resistance, heat resistance, and electrical characteristics. However, they have disadvantages or room for improvement in impact resistance, molding stability, and the like, which have given rise to a bar to practical application.

Various proposals have been made in an attempt to improve impact resistance of polyamide resins. The typical one is addition of a modified ethylene copolymer containing an active group reactive to polyamide resins and having rubbery elasticity as described in Japanese Patent Publication Nos. 4743/79 and 44108/80 and Japanese Patent Application (OPI) No. 23850/83 (the term "OPI" as used herein means an "unexamined published Japanese patent application").

As a result of studies, the present inventors have proved that the above-described method achieves improvement on impact resistance relatively but still insufficiently and that the resulting molded articles are also unsatisfactory in physical property balance among heat resistance, rigidity, and impact resistance. That is, it was found that the somewhat improved impact resistance and softness are cancelled out by other mechanical properties, such as rigidity, tensile strength, hardness, heat resistance, and the like, that are considerably poorer than those of the polyamide resin per se. Besides, the use of the resulting molded articles is often restricted due to their poor appearance, for example, coloring.

Hence, it is important that a polymer to be compounded into polyamide resins should be selected from those of a modified ethylene copolymer type which would not involve these problems, and development of such a polymer has for long been demanded.

SUMMARY OF THE INVENTION

One object of this invention is to provide a crosslinked thermoplastic resin composition mainly comprising a polyamide resin, which is excellent in impact resistance as well as mechanical properties, such as heat resistance and rigidity.

As a result of extensive investigations on a resin composition effective for modification of a polyamide resin, it has now been found that a composition having good balance among impact resistance, heat resistance and rigidity, excellent moldability, and satisfactory appearance can be obtained by compounding an ethylene copolymer having a specific structure and a crosslinkable polyfunctional compound.

The present invention relates to a thermoplastic resin composition which is obtained by melt-kneading (A) from 60 to 97 parts by weight of a polyamide resin and (B) from 3 to 40 parts by weight of an ethylene copolymer comprising (a) from 40 to 90% by weight of an ethylene unit, (b) from 5 to 60% by weight of an alkyl α, β-unsaturated carboxylate unit, and (c) from 0.3 to 10% by weight of a maleic anhydride unit and then melt-kneading the resulting composition with (C) from 0.01 to 20 parts by weight of a polyfunctional compound having at least two functional groups having reactivity to a carboxyl group, a carboxylic acid anhydride group or an amino group per molecule to effect partial crosslinking reaction.

DETAILED DESCRIPTION OF THE INVENTION

The polyamide resin which can be used as component (A) includes various kinds of polyamide obtained by ring-opening polymerization of a lactam having a ring with three or more members, polymerization of a polymerizable ω-amino acid, or polycondensation of a dibasic acid and a diamine, etc., such as polymers of ε-caprolactam, aminocaproic acid, enantholactam, 7-aminoheptanoic acid, 11-aminoundecanoic acid, etc.; polymers obtained by polycondensation between a diamine, e.g., butanediamine, hexamethylenediamine, nonamethylenediamine, undecamethylenediamine, dodecamethylenediamine, m-xylenediamine, etc., and a dicarboxylic acid, e.g., terephthalic acid, isophthalic acid, adipic acid, sebacic acid, dodecanedicarboxylic acid, glutaric acid, etc.; and copolymers of these monomer compounds.

Specific examples of these polyamide resins are aliphatic polyamide resins, e.g., polyamide 4.6, polyamide 6, polyamide 6.6, polyamide 6.10, polyamide 11, polyamide 12, polyamide 6.12, etc.; and aromatic polyamide resins, e.g., polyhexamethylenediamine terephthalamide, polyhexamethylene isophthalamide, xylene-containing polyamide, etc. Preferred of these are polyamide 6, polyamide 6.6, and polyamide 12.

In addition, various copolymer nylon resins having melting points of from 80° to 200° C. which are commercially available for use as hot-melt adhesives can also be utilized either individually or in combination with a polyamide resin having a melting point of 200° C. or more.

The ethylene copolymer as component (B) comprises (a) from 40 to 90% by weight, preferably from 65 to 90% by weight, of an ethylene unit, (b) from 5 to 60% by weight, preferably from 10 to 35% by weight, of an alkyl α, β-unsaturated carboxylate unit, and (c) from 0.3 to 10% by weight, preferably from 1 to 5% by weight, of a maleic anhydride unit.

The alkyl α, β-unsaturated carboxylate as monomer unit (b) are alkyl esters of unsaturated carboxylic acids having from 3 to 8 carbon atoms, e.g., acrylic acid, methacrylic acid, etc. Specific examples of the monomer unit (b) include methyl acrylate, ethyl acrylate, n-propyl acrylate, isopropyl acrylate, n-butyl acrylate, t-butyl acrylate, isobutyl acrylate, methyl methacrylate, ethyl methacrylate, n-propyl methacrylate, isopropyl methacrylate, n-butyl methacrylate, isobutyl methacrylate, etc., with methyl acrylate, ethyl acrylate, n-butyl acrylate, and methyl methacrylate being preferred.

Insofar as the desired properties of the resin composition should be retained, the ethylene copolymer (B)

may further comprise other copolymerizable monomers, such as vinyl acetate, vinyl propionate, etc.

In the ethylene copolymer (B), if the content of the ethylene unit (a) is less than 40% by weight, the resulting polyamide composition suffers from great reduction in rigidity, and an ethylene content exceeding 90% by weight results in insufficient impact resistance. If the content of the alkyl α, β-unsaturated carboxylate unit (b) is less than 5% by weight, satisfactory impact resistance cannot be obtained. If it exceeds 60% by weight, rigidity greatly decreases. Further, if the content of the maleic anhydride unit (c) is less than 0.3% by weight, sufficient impact resistance cannot be obtained, and if it exceeds 10% by weight, the resulting composition does not exhibit satisfactory moldability.

The ethylene copolymer (B) should have a melt index (ASTM D1238) from 1 to 100 g/10 min and preferably from 2 to 50 g/10 min. A melt index exceeding 100 g/10 min results in unfavorable mechanical properties. An ethylene copolymer having a melt index less than 1 g/10 min shows insufficient compatibility with polyamide.

The polyfunctional compound containing at least two functional groups having reactivity to a carboxyl group, a carboxylic acid anhydride group or an amino group per molecule which can be used as component (C) is not particularly limited as long as it has intramolecular crosslinking reactivity to the ethylene copolymer (B) or polyamide resin (A). The polyfunctional compound (C) to be used include, for example, compounds having at least two functional groups selected from an amino group, an epoxy group, a dihydroxazolyl group, a carboxyl group, a carboxylic acid anhydride group, and a hydroxyl group per molecule. These polyfunctional compounds (C) are not particularly limited in molecular weight and embrace high molecular weight compounds.

Specific examples of the compounds having two or more amino groups in the molecule thereof include aliphatic diamines, e.g., 1,6-hexamethylenediamine, trimethylhexamethylenediamine, 1,4-diaminobutane, 1,3-diaminopropane, ethylenediamine, polyether diamine, etc.; aliphatic diamine carbamates, e.g., hexamethylenediamine carbamate, ethylenediamine carbamate, etc.; aliphatic polyamines, e.g., diethylenetriamine, triethylenetetramine, tetraethylenepentamine, pentaethylenehexamine, ethylaminoethylamine, methylaminopropylamine, 2-hydroxyethylaminopropylamine, aminoethylethanolamine, 1,2-bis(3-aminopropoxy)-2,2-dimethylpropane, 1,3,6-trisaminomethylhexane, iminobispropylamine, methyliminobispropylamine, bis(hexamethylene)triamine, etc.; alicyclic polyamines, e.g., methanediamine, N-aminoethylpiperazine, 1,3-diaminocyclohexane, isophorondiamine, bis(4-amino-3-methylcyclohexyl)methane, etc.; aliphatic polyamines having an aromatic ring, e.g., m-xylylenediamine, tetrachloro-p-xylylenediamine, etc.; aromatic amines, e.g., m-phenylenediamine, diaminodiphenyl ether, 4,4'-methylenedianiline, diaminodiphenylsulfone, benzidine, 4,4'-bis(p-toluidine), 4,4'-thiodianiline, o-phenylenediamine, dianisidine, methylenebis(o-chloroaniline), 2,4-toluenediamine, bis-(3,4-diaminophenyl)sulfone, diaminoditolylsulfone, 4-chloro-o-phenylenediamine, 4-methoxy-6-methyl-m-phenylenediamine, m-aminobenzylamine, etc.; polyamines containing silicon, e.g., 1,3-bis(γ-aminopropyl)-1,1,3,3-tetramethyldisiloxane, etc.; amine-modified silicone oils; aminoterminated butadiene-acrylonitrile copolymers; tertiary amine compounds, e.g., N,N,N',N'-tetramethylhexamethylenediamine, N,N,N',N'',N''-pentamethyldiethylenetriamine, etc.; ethylene copolymers comprising an ethylene unit and an N,N-dialkylaminoalkyl α,β-unsaturated carboxylate unit, e.g., an ethylene-N,N-dimethylaminoethyl methacrylate copolymer, etc.; ethylene copolymers comprising an ethylene unit and an N,N-dialkylaminoalkyl α, β-unsaturated carboxylic acid amide unit, e.g., an ethylene-N,N-dimethylaminopropylacrylamide copolymer, etc.; dihydrazide compounds, e.g., succinic acid dihydrazide, adipic acid dihydrazide, isophthalic acid dihydrazide, eicosanedicarboxylic acid dihydrazide, etc.; diaminomaleonitrile; melamine; and the like.

The compounds having two or more epoxy groups per molecule are largely divided into olefin copolymers and epoxy resins. Specific examples of the olefin copolymers are copolymers of an olefin and diglycidyl methacrylate and/or diglycidyl acrylate. The olefin includes ethylene, propylene, butene-1, isobutylene, pentene-1, hexene-1, heptene-1, octene-1, dodecene-1, etc., with ethylene being preferred. The olefin copolymer may further contain an alkyl α,β-unsaturated carboxylate unit or a vinyl carboxylate unit as a comonomer. Examples of such a comonomer are alkyl esters of acrylic acid, methacrylic acid, etc. (e.g., methyl acrylate, ethyl acrylate, n-butyl acrylate, methyl methacrylate, etc.), vinyl acetate, vinyl propionate, and the like. The olefin copolymers further embrace glycidyl methacrylate-modified ethylene propylene rubber, ethylene-methyl acrylate-glycidyl methacrylate copolymer rubber, and the like.

The olefin copolymers can be prepared by any of random copolymerization, block copolymerization, and graft copolymerization. The glycidyl methacrylate unit and/or glycidyl acrylate unit in the olefin copolymer should be in the range of from 5 to 50% by weight. Otherwise, the improvement of physical properties would be insufficient.

The epoxy resin includes bisphenol A type epoxy resins, bisphenol F type epoxy resins, novolak type epoxy resins, alicyclic epoxy resins, glycidyl ester resins, glycidylamine resins, hydantoin type epoxy resins, triglycidyl isocyanurate, etc.

The compounds containing two or more dihydroxazolyl groups per molecule include 2,2'-(1,3-phenylene)-bis(2-oxazoline), a styrene-vinyloxazoline copolymer, etc.

The compounds containing two or more of carboxyl, carboxylic acid anhydride, or hydroxyl groups include terephthalic acid, isophthalic acid, adipic acid, sebacic acid, dodecanedicarboxylic acid, an ethylene-acrylic acid copolymer, trimellitic acid anhydride, pyromellitic acid anhydride, ethylene glycol bis(anhydrotrimellitate), an isobutylene-maleic anhydride copolymer, a styrene-maleic anhydride copolymer, trimethylolpropane, pentaerythritol, a saponification product of an ethylene-vinyl acetate copolymer, etc.

The thermoplastic resin composition according to the present invention comprises from 60 to 97 parts by weight, preferably from 70 to 90 parts by weight, of the polyamide resin (A), and from 3 to 40 parts by weight, preferably from 10 to 30 parts by weight, of the ethylene copolymer (B). If the polyamide resin content is less than 60 parts by weight, rigidity and heat resistance of the resulting composition become insufficient, and if it exceeds 97 parts by weight, the composition has insufficient impact resistance.

The amount of the polyfunctional compound (C) to be compounded should be determined depending on the reactivity of the functional groups thereof to a carboxyl, carboxylic acid anhydride or amino group from a range of from 0.01 to 20 parts by weight per 100 parts by weight of the total of the polyamide resin (A) and the ethylene copolymer (B). If it is less than 0.01 part by weight, the effects to improve mechanical properties, such as heat resistance, impact resistance, and the like, would be insufficient. Amounts exceeding 20 parts by weight do not produce any further improvement.

The thermoplastic resin composition of the present invention can be prepared by first melt-kneading the components (A) and (B) and then adding the polyfunctional compound (C) to the resulting polymer blend, followed by melt-kneading to effect partial crosslinking reaction.

It is considered that the component (C) added and melt-kneaded forms a polymer having satisfactory physical properties in a micro-dispersed state through moderate crosslinking reaction. It is generally accepted that improvement on heat deformation properties, in turn, tends to increase rigidity, which would lead to reduced impact resistance. By contrast, the composition of this invention unexpectedly exhibits both improved heat resistance and improved impact resistance without suffering deterioration in other physical properties.

In the production of the resin composition, the melt-kneading can be carried out by means of commonly employed kneading machines, such as single- or twin-screw extruders, a Banbury mixer, a roll, and various types of kneaders.

The molten mixture of the components (A) and (B) obtained in, for example, an extruder may be once granulated, and the component (C) is then added thereto, followed by melt-kneading in an extruder. It is preferable, however, that the components (A) and (B) are melt-kneaded in a front zone of an extruder equipped with a side feeder to prepare a molten mixture and then the component (C) either in a solid or molten state is fed thereto from a side feed opening at a rear zone of the same extruder and melt-kneaded to obtain the resin composition. It is also preferable that the component (C) is previously melt-kneaded together with a resin inert thereto to prepare a master batch, which is appropriately added to a resin composition comprising the components (A) and (B) when necessary. In carrying out kneading, the resinous components, each in the form either of powder or pellet, are preferably dry-blended uniformly by the use of a mixing means, e.g., a tumbling mixer, a Henschel mixer, etc. If desired, such dry-blending may be omitted, and each of the resinous components may be individually fed to a kneading machine.

If desired, the resin composition according to the present invention may further comprise other optional components, such as pigments, dyes, reinforcements, fillers, thermal stabilizers, antioxidants, weathering agents, nucleating agents, lubricants, antistatics, flame retardants, plasticizers, or the like additives, and other polymers, as far as addition of these components does not impair moldability and physical properties of the resulting resin composition.

In particular, addition of reinforcements or fillers, such as glass fibers having been subjected to various finishing treatments, carbon fibers, talc, calcium carbonate, etc., produces a very useful resin composition having markedly improved rigidity and impact strength.

The resin composition of the present invention can be molded by various molding methods, such as injection molding, extrusion molding, and the like.

The present invention is now illustrated in greater detail with reference to Examples and Comparative Examples, but it should be understood that the present invention is not limited thereto. In these examples, all the parts, percents and ratios are by weight unless otherwise indicated.

The resin compositions obtained in these examples and comparative examples were evaluated according to the following test methods.

1) Flexural Modulus

Measured in accordance with ASTM D790 (specimen thickness: 3.2 mm; measuring temperature: 23° C.).

2) Izod Impact Strength

Measured in accordance with ASTM D256 (specimen thickness: 3.2 mm; measuring temperature: 23° C. and −40° C.; V-shaped notch).

3) Heat Deformation Temperature

Measured in accordance with ASTM D640 (specimen thickness 3.2 mm; bending stress: 4.6 kgf/cm$^2$).

4) Melt Index

Measured in accordance with ASTM D1238 (190° C., 2160 g).

The polyamide resins, ethylene copolymers and polyfunctional compounds used in the examples and comparative examples were as follows.

A) Polyamide resin (1) Polyamide 6.6 ("Maranyl ® A 125" produced by Unitika Ltd.)

(2) Polyamide 6 ("A 1030 BRL" produced by Unitika Ltd.)

B) Ethylene Copolymer (1) Copolymer (1) (E/EA/MAH=66.8/32.0/1.2; MI: 7 g/10 min)

(2) Copolymer (2) (E/EA/MAH=71.9/25.0/3.1; MI: 33 g/10 min)

(3) Copolymer (3) (E/MA/MAH=70.2/27.8/2.0; MI: 15 g/10 min)

(4) Copolymer (4) (E/MAH=95.0/5.0; MI: 10 g/10 min)

Abbreviations used here have the following meanings:
E: Ethylene
EA: Ethyl acrylate
MA: Methyl acrylate
MAH: Maleic anhydride
MI: Melt index The above-described ethylene copolymers can be prepared by the processes described in French Patent 1,323,379 and French patent application No. 81/01430.

C) Polyfunctional Compound:

(1) Bondfast ® E [ethylene/glycidyl methacrylate copolymer (88/12) produced by Sumitomo Chemical Co., Ltd.; MI: 3 g/10 min)]

(2) Acryft ® CM 4008 [ethylene/methyl methacrylate copolymer (81/19) produced by Sumitomo Chemical Co., Ltd.; MI: 7 g/10 min)]

(3) Platamid® H005 (copolyamide produced by Plate Bonn GmbH; specific gravity: 1.08; melting point: 115° to 125° C.)

(4) Siliconediamine X-22-161C (silicone oil having a primary amino group at both terminals of dimethylpolysiloxane, produced by Shin-etsu Chemical Ind., Co., Ltd.; amine equivalent: 1625)

(5) E-DAM Copolymer [ethylene/dimethylaminoethyl methacrylate copolymer (72/28); MI: 100 g/10 min)]

(6) Yukalon® EAA-510W [ethylene/acrylic acid copolymer (80/20) produced by Mitsubishi Petrochemical Co., Ltd.; MI: 300 g/10 min]

(7) Saponified E-VA (saponification product of an ethylene/vinyl acetate copolymer (57/43); degree of saponification: 99%; MI: 35 g/10 min)

(8) MB-1 (master batch prepared by melt-kneading 1 part of hexamethylenediamine carbamate and 99 parts of Acryft® CM4008 at 200° C. in a 30 mmφ vented single-screw extruder)

(9) MB-2 (master batch prepared by melt-kneading 1 part of hexamethylenediamine carbamate and 99 parts of Platamid® H005 at 170° C. in a 30 mmφ vented single-screw extruder)

(10) MB-3 (master batch prepared by melt-kneading 5 parts of 2,2'-(1,3-phenylene)-bis(2-oxazoline) and 95 parts of Acryft® CM4008 at 200° C. in a 30 mmφ vented single-screw extruder)

(11) MB-4 (master batch prepared by melt-kneading 2 parts of pyromellitic acid anhydride and 98 parts of an ethylene-propylene rubber ("E-120P" produced by Sumitomo Chemical Co., Ltd.) at 200° C. in a 30 mmφ vented single-screw extruder)

EXAMPLES 1 to 13 AND COMPARATIVE EXAMPLE 13

A polyamide resin and an ethylene copolymer indicated in Table 1 below were melt-kneaded in a 30 mmφ vented single-screw extruder at a temperature of 270° C. in the case of using polyamide 6.6 or at 240° C. in the case of using polyamide 6.

The resulting blend was mixed with a polyfunctional compound as shown in Table 1, and the mixture was melt-kneaded at a temperature as described above in the same extruder as described above to obtain a resin composition.

Each of the resulting compositions was dried at 80° C. for 12 hours and molded by means of a 10 oz. injection molding machine ("IS-150E-V Model" manufactured by Toshiba Corporation) at a temperature of 290° C. in the case of using polyamide 6.6 or at 260° C. in the case of using polyamide 6 and at a mold temperature of 70° C. to prepare test specimens for physical property measurement. The test results obtained are shown in Table 1.

COMPARATIVE EXAMPLES 1 AND 4

A polyamide resin, an ethylene copolymer, and a polyfunctional compound indicated in Table 1 were melt-kneaded through one step at 270° C. by the use of a 30 mmφ vented single-screw extruder. The test results obtained are shown in Table 1.

COMPARATIVE EXAMPLES 2, 3, 5 AND 8

A polyamide resin and an ethylene copolymer as shown in Table 1 were melt-kneaded by means of a 30 mmφ vented single-screw extruder at a temperature of 270° C. in the case of using polyamide 6.6 or at 240° C. in the case of using polyamide 6 to prepare a resin composition. The test results obtained are shown in Table 1.

COMPARATIVE EXAMPLES 6 AND 9

A polyamide resin and a polyfunctional compound shown in Table 1 were melt-kneaded by using a 30 mmφ vented single-screw extruder at a temperature of 270° C. in the case of using polyamide 6.6 or at 240° C. in the case of using polyamide 6 to prepare a resin composition. The test results obtained are shown in Table 1.

COMPARATIVE EXAMPLES 7 AND 10

Each of polyamide 6.6 and polyamide 6 was evaluated for physical properties. The results obtained are shown in Table 1.

COMPARATIVE EXAMPLES 11 AND 12

A polyamide resin and an ethylene copolymer shown in Table 1 were melt kneaded in a 30 mmφ vented single-screw extruder at 270° C. to obtain a resin blend.

The resulting blend was mixed with Acryft® CM4008 of Platamid® H005, and the mixture was melt-kneaded at 270° C. in the same extruder. The test results obtained are shown in Table 1.

EXAMPLE 14

Polyamide 6.6 and Copolymer (1) were melt-kneaded at 270° C. by the use of a 44 mmφ vented twin-screw extruder having a side feeder at the middle portion of the barrel. While these resinous components were melt-kneaded, a polyfunctional compound shown in Table 1 was fed from the side feed opening of the extruder at a constant rate and melt-kneaded to obtain a resin composition. The test results obtained are shown in Table 1.

TABLE 1

| Example No. | Polyamide Resin (Amount: part) | Ethylene Copolymer (Amount: part) | Polyfunctional Compound (Amount: part) | Kneading Step | Flexural Modulus (23° C.) (kg/cm$^2$) | Izod Impact Strength (kg · cm/cm) 23° C. | Izod Impact Strength (kg · cm/cm) −40° C. | Heat Deformation Temperature (4.6 kg/cm$^2$) (°C.) |
|---|---|---|---|---|---|---|---|---|
| Example 1 | Polyamide 6.6 (80) | Copolymer (1) (15) | Bondfast® E (5) | 2-step | 19300 | NB | 14 | 180 |
| Comparative Example 1 | Polyamide 6.6 (80) | Copolymer (1) (15) | Bondfast® E (5) | 1-step | 18200 | 7 | 6 | 210 |
| Comparative Example 2 | Polyamide 6.6 (80) | Copolymer (1) (20) | — | 1-step | 19300 | NB | 12 | 115 |
| Example 2 | Polyamide 6.6 (70) | Copolymer (1) (20) | Bondfast® E (10) | 2-step | 14500 | NB | 30 | 136 |
| Comparative Example 3 | Polyamide 6.6 (70) | Copolymer (1) (30) | — | 1-step | 14600 | NB | 25 | 90 |
| Example 3 | Polyamide 6.6 (80) | Copolymer (2) (15) | Bondfast® E (5) | 2-step | 18600 | NB | 12 | 185 |
| Comparative Example 4 | Polyamide 6.6 (80) | Copolymer (2) (15) | Bondfast® E (5) | 1-step | 17500 | 9 | 7 | 201 |
| Comparative Example 5 | Polyamide 6.6 (80) | Copolymer (2) (20) | — | 1-step | 18100 | NB | 12 | 111 |

TABLE 1-continued

| Example No. | Polyamide Resin (Amount: part) | Ethylene Copolymer (Amount: part) | Polyfunctional Compound (Amount: part) | Kneading Step | Flexural Modulus (23° C.) (kg/cm²) | Izod Impact Strength (kg · cm/cm) 23° C. | Izod Impact Strength (kg · cm/cm) −40° C. | Heat Deformation Temperature (4.6 kg/cm²) (°C.) |
|---|---|---|---|---|---|---|---|---|
| Comparative Example 6 | Polyamide 6.6 (80) | — | Bondfast ® E (20) | 1-step | 19800 | 11 | 7 | 210 |
| Example 4 | Polyamide 6.6 (80) | Copolymer (3) (15) | Bondfast ® E (5) | 2-step | 19000 | NB | 20 | 186 |
| Comparative Example 7 | Polyamide 6.6 (100) | — | — | — | 29000 | 4 | 3 | 231 |
| Example 5 | Polyamide 6 (80) | Copolymer (2) (15) | Bondfast ® (5) | 2-step | 18000 | NB | 10 | 172 |
| Comparative Example 8 | Polyamide 6 (80) | Copolymer (2) (20) | — | 1-step | 18000 | 8 | 6 | 171 |
| Comparative Example 9 | Polyamide 6 (80) | — | Bondfast ®E (20) | 1-step | 18300 | 10 | 7 | 172 |
| Comparative Example 10 | Polyamide 6 (100) | — | — | — | 26300 | 2 | 1 | 178 |
| Example 6 | Polyamide 6.6 (80) | Copolymer (2) (16) | MB-1 (4) | 2-step | 18300 | NB | 11 | 179 |
| Comparative Example 11 | Polyamide 6.6 (80) | Copolymer (2) (16) | Acryft ® CM40008 (4) | 2-step | 17900 | NB | 10 | 118 |
| Example 7 | Polyamide 6.6 (80) | Copolymer (2) (16) | MB-2 (4) | 2-step | 19800 | NB | 15 | 183 |
| Comparative Example 12 | Polyamide 6.6 (80) | Copolymer (2) (16) | Platamid ® H005 (4) | 2-step | 19600 | NB | 15 | 122 |
| Example 8 | Polyamide 6.6 (80) | Copolymer (2) (20) | Siliconedi- amine X-22-161C (1) | 2-step | 17900 | NB | 13 | 174 |
| Example 9 | Polyamide 6.6 (80) | Copolymer (2) (15) | E-DAM (5) Copolymer | 2-step | 18200 | NB | 11 | 175 |
| Example 10 | Polyamide 6.6 (80) | Copolymer (2) (16) | MB-3 (4) | 2-step | 18100 | NB | 12 | 175 |
| Example 11 | Polyamide 6.6 (80) | Copolymer (2) (15) | Yukalon ® EAA-510 W (5) | 2-step | 19200 | NB | 10 | 172 |
| Example 12 | Polyamide 6.6 (80) | Copolymer (2) (15) | Saponified E-VA (5) | 2-step | 19800 | NB | 10 | 135 |
| Example 13 | Polyamide 6.6 (80) | Copolymer (2) (16) | MB-4 (4) | 2-step | 18300 | NB | 10 | 132 |
| Example 14 | Polyamide 6.6 (80) | Copolymer (1) (15) | Bondfast ® E (5) | 2-step | 19000 | NB | 14 | 208 |
| Comparative Example 13 | Polyamide 6.6 (80) | Copolymer (4) (15) | Bondfast ® E (5) | 2-step | 20500 | 12 | 6 | 182 |

Note: NB in Table 1 means non-break.

As described above, the thermoplastic resin composition in accordance with the present invention provides molded articles having a very good balance of various physical properties, such as mechanical and thermal properties, and satisfactory appearance.

In particular, the fact that the addition of the polyfunctional compound achieves improvements of heat deformation properties and impact resistance without impairing other physical properties is an unpredictable result.

The resin composition of the present invention can be molded easily into films, sheets or other molded articles by molding methods employed for general polyamide based thermoplastic resin compositions, such as injection molding, extrusion molding, and the like, to provide resin products exhibiting a very good balance of physical properties, such as impact resistance, rigidity, heat resistance, and the like, and uniform and smooth appearance.

While the invention has been described in detail and with reference to specific embodiments thereof, it will be apparent to one skilled in the art that various changes and modifications can be made therein without departing from the spirit and scope thereof.

What is claimed is:

1. An impact resistant polyamide resin composition obtained by:
   melt kneading a mixture comprising:
   (A) from 60 to 97 parts by weight of a polyamide resin, and
   (B) from 3 to 40 parts by weight of an ethylene copolymer comprising:
      (a) from 40 to 90% by weight of an ethylene unit,
      (b) from 5–60% by weight of an α, β-unsaturated carboxylic acid alkyl ester unit, and
      (c) from 0.3 to 10% by weight of a maleic anhydride unit; and melt kneading said mixture with
   (C) from 0.01 to 20 parts by weight, based on 100 parts by weight of the sum of the polyamide resin (A) and the ethylene copolymer (B), of compound containing at least two amino groups per molecule selected from a group consisting of an aliphatic diamine carbamate, an aliphatic polyamine, an alicyclic polyamine, and an aromatic aminel.

2. A impact-resistant polyamide resin composition as claimed in claim 1, wherein said ethylene copolymer (B) comprises (a) from 65 to 90% by weight of an ethylene unit, (b) from 10 to 35% by weight of an unsaturated carboxylic acid alkyl ester unit, and (c) from 1 to 5% by weight of a maleic anhydride unit.

3. A impact-resistant polyamide resin composition as claimed in claim 1, wherein said compound (C) is an aliphatic diamine carbamate.

* * * * *